W. E. TAFT.
VALVE FOR INTERNAL COMBUSTION ENGINES.
APPLICATION FILED MAR. 29, 1912.

1,086,794.

Patented Feb. 10, 1914.

Witnesses

Inventor
Walter E. Taft.

UNITED STATES PATENT OFFICE.

WALTER E. TAFT, OF PROVIDENCE, RHODE ISLAND.

VALVE FOR INTERNAL-COMBUSTION ENGINES.

1,086,794. Specification of Letters Patent. Patented Feb. 10, 1914.

Application filed March 29, 1912. Serial No. 687,176.

*To all whom it may concern:*

Be it known that I, WALTER E. TAFT, a citizen of the United States, residing at Providence, in the county of Providence and State of Rhode Island, have invented a new and useful Improvement in Valves for Internal-Combustion Engines, of which the following is a specification.

The object of my invention is to avoid liability of an explosion in the valve chamber, and to provide a valve that is guarded against the great pressure due to the explosion of the gas in the cylinder of the engine, and is also provided with means for lessening the friction of its oscillating movement.

Figure 1:
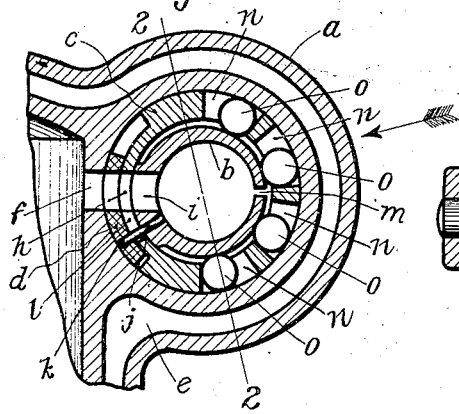
Figure 2:
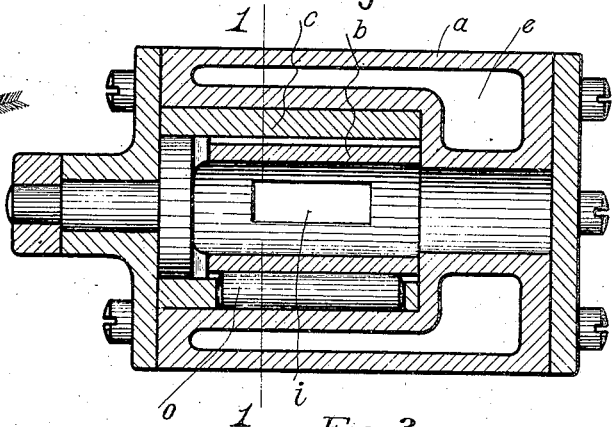
Figure 7:
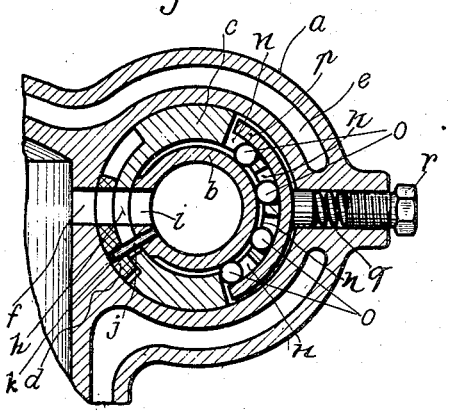
Figure 3:
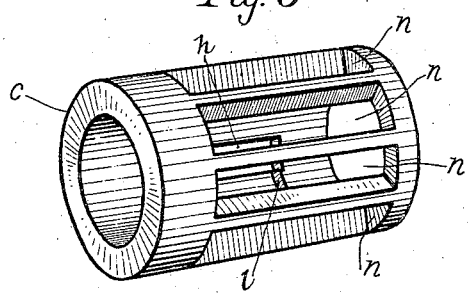
Figure 4:
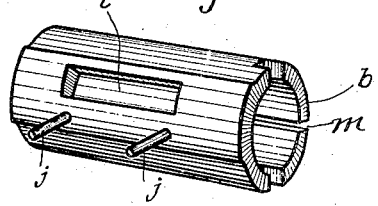
Figure 5:
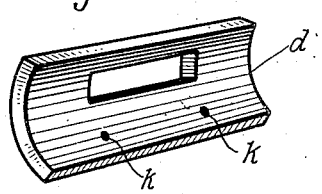
Figure 6:
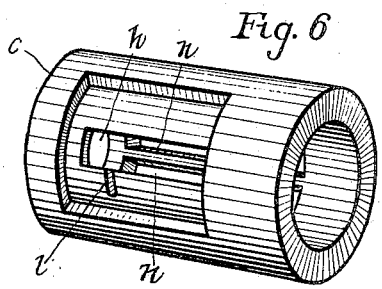

In the accompanying drawing: Figure 1 is a transverse section of the valve and the valve chamber. Fig. 2 is a longitudinal section of the same. Fig. 3 is a perspective view of the lining for the valve chamber, showing the chambers for receiving the anti-friction rollers. Fig. 4 is a perspective view of the valve. Fig. 5 is a perspective view of the supplementary valve. Fig. 6 is a perspective view of the lining for the valve chamber, showing the seat for the supplementary valve. Fig. 7 is a transverse section showing a modification.

In the drawing, $a$ represents the valve casing, $b$ the oscillating valve, $c$ the lining of the valve casing, which lining affords a complementary seat for the valve $b$.

$d$ is the supplementary valve.

The valve casing $a$ is provided with the water passage $e$ for cooling the said casing, and with the port $f$, which may constitute either an inlet or an exhaust port as the case may be, and the lining $c$ of the valve casing is also provided with a port $h$, held in register with the said port $f$, and between the said casing $a$, and the lining $c$ is placed the supplementary valve $d$, which is connected for simultaneous movement with the valve $b$, by means of the pins $j, j$, which enter the holes $k, k$, made in the said supplementary valve, the said pins crossing from one of the said valves to the other, through the slots $l, l$, of the lining $c$.

The valve $b$ as shown in Fig. 1, is made with the axis of the bore located the axis of the periphery, and gitudinal slot $m$ made in the the said tube, whereby the be caused to yield resiliently under pressure. The lining $c$ of the valve casing is provided with openings $n, n$, for the reception of the anti-friction rollers $o, o$, which serve to provide means for the prevention of excessive friction at the back of the valve, when the said valve is operating under heavy pressure. The anti-friction rollers in this construction as well as in the construction next described, have their axes arranged parallel with the axis of the valve $b$.

A modification of my invention is shown in Fig. 7 in which the valve $b$ is non resilient, and the anti-friction rollers $o, o$, are backed by means of a shoe $p$, which is resiliently held in its bearing position against the said rollers by means of the spiral spring $q$ and the adjusting screw $r$.

The supplementary valve $d$ serves to protect the inner valve $b$, from the effect of the excessive pressure of the explosion when the said valve is closed.

I claim as my invention:

1. An oscillating valve having a cylindrical face, a complementary valve seat, and a plurality of anti-friction rollers supported in the valve seat and bearing upon the valve and having their axes arranged parallel with the axis of the valve.

2. A valve casing provided with a port for the passage of the motive fluid, a lining for the said casing, also provided with a port registering with the said port in the casing, a cylindrical valve within the said lining, a supplemental valve located at the outer side of the said lining and having its seat thereon, and operatively connected with the said inner valve for simultaneous movement therewith.

3. A valve casing provided with a port for the passage of the motive fluid, a lining for the said casing, also provided with a port registering with the said port in the casing, a cylindrical valve within the said lining a plurality of anti-friction rollers bearing against the back of the said valve, a bearing shoe at the back of the said rollers, and an adjustable spring at the back of the bearing shoe.

4. A valve for internal combustion engines, comprising a casing, a lining, an oscillating valve within said lining, antifriction means interposed between the valve and its casing and supported in said casing, and means for allowing a yielding action of the valve while retaining its position in the lining.

5. A valve, including an inner valve, and a supplementary valve, a seat for the inner valve, resilient means to hold said inner valve to its seat, and a seat for the supplementary valve, said supplementary valve held to its seat by pressure of explosion or compression.

WALTER E. TAFT.

Witnesses:
SOCRATES SCHOLFIELD,
W. S. MARSH.